United States Patent
Shiga et al.

(10) Patent No.: US 8,625,620 B2
(45) Date of Patent: Jan. 7, 2014

(54) COMMUNICATION SYSTEM AND COMMUNICATION CONTROL METHOD FOR REQUESTING CANCELLATION OF REGISTRATION AS BAD TERMINAL

(75) Inventors: Shingo Shiga, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 255 days.

(21) Appl. No.: 13/122,264

(22) PCT Filed: Oct. 5, 2009

(86) PCT No.: PCT/JP2009/005166
§ 371 (c)(1),
(2), (4) Date: Apr. 1, 2011

(87) PCT Pub. No.: WO2010/041414
PCT Pub. Date: Apr. 15, 2010

(65) Prior Publication Data
US 2011/0188412 A1    Aug. 4, 2011

(30) Foreign Application Priority Data
Oct. 6, 2008   (JP) ................. 2008-259419
Dec. 25, 2008  (JP) ................. 2008-329149

(51) Int. Cl.
H04L 12/28   (2006.01)
G06F 15/173  (2006.01)
H04M 1/56    (2006.01)
H04L 29/06   (2006.01)
H04M 1/57    (2006.01)

(52) U.S. Cl.
CPC . H04L 63/10 (2013.01); H04M 1/57 (2013.01)

USPC .......... 370/410; 709/225; 379/142.06; 726/4

(58) Field of Classification Search
None
See application file for complete search history.

(56) References Cited

U.S. PATENT DOCUMENTS

| 6,311,055 | B1 | 10/2001 | Boltz |
| 6,330,317 | B1 | 12/2001 | Garfinkel |
| 7,042,997 | B2 | 5/2006 | Jones |
| 7,231,030 | B2 | 6/2007 | Jones |
| 8,243,716 | B2 | 8/2012 | Liu et al. |

(Continued)

FOREIGN PATENT DOCUMENTS

| CN | 1581904 A | 2/2005 |
| CN | 1630362 A | 6/2005 |

(Continued)

OTHER PUBLICATIONS

United States Office Action for U.S. Appl. No. 13/122,274 dated Dec. 20, 2012.

(Continued)

*Primary Examiner* — Timothy J Weidner (57) ABSTRACT

A communication system providing a multimedia service which enables requesting a communication network to cancel a registration for a calling terminal as a bad terminal in the communication network. Typically, the calling terminal is connected to a calling-side communication network; and if the calling terminal is registered as a bad terminal in a called-side communication network, the calling-side communication network requests the called-side communication network to cancel the registration. The calling terminal may be informed that reception of a communication in the communication system has been restricted.

8 Claims, 5 Drawing Sheets

(56) References Cited

U.S. PATENT DOCUMENTS

| | | | |
|---|---|---|---|
| 8,365,284 | B2 | 1/2013 | Wahl |
| 2004/0221037 | A1* | 11/2004 | Costa-Requena et al. .... 709/225 |
| 2006/0182029 | A1* | 8/2006 | Kealy et al. ................... 370/230 |
| 2007/0027993 | A1* | 2/2007 | Schwagmann et al. ....... 709/227 |
| 2007/0041372 | A1 | 2/2007 | Rao et al. |
| 2007/0121596 | A1 | 5/2007 | Kurapati et al. |
| 2007/0165821 | A1 | 7/2007 | Altberg et al. |
| 2007/0283022 | A1* | 12/2007 | Rajko et al. ................... 709/227 |
| 2008/0062968 | A1 | 3/2008 | Takahashi et al. |
| 2008/0075258 | A1 | 3/2008 | Liu et al. |
| 2008/0089317 | A1 | 4/2008 | Murakami et al. |
| 2008/0220740 | A1* | 9/2008 | Shatzkamer et al. ......... 455/411 |
| 2009/0103458 | A1* | 4/2009 | Charzinski et al. ........... 370/259 |
| 2010/0226261 | A1* | 9/2010 | Piche ............................. 370/252 |
| 2011/0179181 | A1 | 7/2011 | Elz |
| 2011/0211497 | A1 | 9/2011 | Shiga et al. |
| 2011/0222481 | A1 | 9/2011 | Shiga |
| 2012/0297457 | A1* | 11/2012 | Schulte et al. .................... 726/4 |

FOREIGN PATENT DOCUMENTS

| | | |
|---|---|---|
| CN | 1984184 A | 6/2007 |
| CN | 101035098 A | 9/2007 |
| CN | 101132590 A | 2/2008 |
| EP | 1 770 941 A1 | 4/2007 |
| JP | 64-54854 A | 3/1989 |
| JP | 1-95649 A | 4/1989 |
| JP | 3-244257 A | 10/1991 |
| JP | 4-32340 A | 2/1992 |
| JP | 7-66868 A | 3/1995 |
| JP | 2000-312256 A | 11/2000 |
| JP | 2003-198756 A | 7/2003 |
| JP | 2004-96531 A | 3/2004 |
| JP | 2005-20524 A | 1/2005 |
| JP | 2005244420 A | 9/2005 |
| JP | 2005-277694 A | 10/2005 |
| JP | 2007-60419 A | 3/2007 |
| JP | 2007527633 A | 9/2007 |
| JP | 2008-5102 A | 1/2008 |
| JP | 2008-48055 A | 2/2008 |
| JP | 2008099213 A | 4/2008 |
| JP | 2008-205937 A | 9/2008 |
| WO | 2007/085507 A1 | 8/2007 |
| WO | 20070134810 A1 | 11/2007 |
| WO | 2008/032466 A1 | 3/2008 |
| WO | 2009/045212 A1 | 4/2009 |

OTHER PUBLICATIONS

International Search Report for PCT/JP2009/005166 mailed Nov. 2, 2009.
"Telecommunications and Internet Converged Services and Protocols for Advanced Networking (TISPAN); Feasibility study of prevention of unsolicited communication in the NGN", ETSI TR 187 009, V2.1.1, Jul. 2008, pp. 16-18.
International search report for PCT/JP2009/005195 mailed on Nov. 2, 2009.
International search report for PCT/JP2009/005167 mailed on Dec. 1, 2009.
US Office Action for U.S. Appl. No. 13/122,267 dated on Mar. 25, 2013.
Chinese Office Action for CN Application No. 200980139194.0 issued on May 6, 2013 with English Translation.
Chinese Office Action for CN Application No. 200980139195.5 issued on Apr. 28, 2013, with English Translation.
Japanese Office Action for JP Application No. 2008-329148 mailed on May 28, 2013 with English Translation.
Japanese Office Action for JP Application No. 2008-329150 mailed on Jun. 4, 2013 with English Translation.
US Final Rejection for U.S. Appl. No. 13/122,267 mailed on Aug. 27, 2013.
Japanese Notice of Allowance for JP Application No. 2008-329150 mailed on Sep. 3, 2013 with Partial English Translation.
The Extended European Search Report for EP Application No. 09818954.1 dated on Sep. 6, 2013.
The Extended European Search Report for EP Application No. 09818970.7 dated on Sep. 6, 2013.
Cited in the Notice of Allowance, the U.S. Appl. No. 13/122,274, mailed on Sep. 20, 2013.
"Telecommunications and Internet Converged Services and Protocols for Advanced Networking (TISP AN); Feasibility study of prevention of unsolicited communication in the NGN", ETSI, <ETSI TR 187 009 V2.1.1>, Jul. 31, 2008, pp. 1-26. Cited in the CN OA.
Chinese Office Action for CN Application No. 200980139195.5 issued on Sep. 11, 2013 with English Translation.

* cited by examiner

COMMUNICATION SYSTEM AND COMMUNICATION CONTROL METHOD FOR REQUESTING CANCELLATION OF REGISTRATION AS BAD TERMINAL

The present application is the National Phase of PCT/JP2009/005166, filed Oct. 5, 2009, which claims priority based Japanese Patent Applications No. 2008-259419, filed Oct. 6, 2008, and No. 2008-329149, filed Dec. 25, 2008, the contents of which are incorporated herein by reference.

TECHNICAL FIELD

The present invention relates to a communication system and a communication control method as a basis for a multimedia service which includes a voice service on an IP network.

BACKGROUND ART

In accordance with a recent trend using an IP (Internet protocol), an IP-employed system has, of course, been attempted for voice communication systems which representatively use a telephone network. A standardization group called "3GPP" (3rd generation partnership project) for mobile communication performs standardization of IMS (Internet multimedia subsystem) as a basis for a multimedia service which includes a voice service on an IP network. In recent years, a static or fixed IP system known as "NGN" (next generation network) has also been examined.

Current email services have a social problem in which a sender unilaterally sends an email (message) called a spam mail to a receiver, although the receiver does not want to receive the mail. Such a problem may be caused due to a considerable decrease in the communication cost accompanied with generalization of the Internet, or possibility of sending a large quantity of email from a network accessing terminal such as a personal computer which is easily available.

The above IMS, which will be popular in the future, will probably have a similar problem. A technique for protecting users from such a problem which is called SPIT (spam over IP telephony) is called "PUCI" (protection against unsolicited communication for IMS), and examination thereof has been started by 3GPP or the like. The following Patent Document 1 discloses an IMS network system.

PRIOR ART DOCUMENT

Patent Document

Patent Document 1: Published Japanese Translation, No. 2007-527633, of PCT International Publication, No. WO2004/071104

DISCLOSURE OF INVENTION

Problem to be Solved by the Invention

In light of the above circumstances, an object of the present invention is to provide a communication system and a communication control method which can protect user convenience against a problem relating to the above SPIT.

Means for Solving the Problem

In order to achieve the above object, the present invention provides a communication system providing a multimedia service which enables requesting a communication network to cancel a registration for a calling terminal as a bad terminal in the communication network.

Typically, the calling terminal is connected to a calling-side communication network; and if the calling terminal is registered as a bad terminal in a called-side communication network, the calling-side communication network requests the called-side communication network to cancel the registration.

In a typical example for the above case, the calling-side communication network includes an access request transfer device that transfers an access request, which has been sent from the calling terminal, to the called-side communication network;

an access request cancel notice receiving device that receives an access request cancel notice, which indicates cancellation of the access request, from the called-side communication network;

an access-disable terminal information registering device that registers in an access-disable terminal storage device, based on the received access request cancel notice, identification information of the calling terminal which sent the access request and identification information of the called-side communication network which sent the access request cancel notice, which are associated with each other in the registration;

a terminal safety verifying device that verifies safety of the calling terminal; and an access rejection cancel request sending device that sends an access rejection cancel request to the called-side communication network when it is determined in the safety verification that the calling terminal satisfies the safety, where the access rejection cancel request contains the identification information of the calling terminal, and is sent by using the identification information of the called-side communication network which has been registered in the access-disable terminal storage device in association with the identification information of the calling terminal.

The present invention also provides a communication control method used in a communication system which controls communication between a calling terminal connected to a calling-side communication network and a called terminal connected to a called-side communication network, wherein:

an access request transfer device in the calling-side communication network transfers an access request, which has been sent from the calling terminal, to the called-side communication network;

an access request cancel notice receiving device in the calling-side communication network receives an access request cancel notice, which indicates cancellation of the access request, from the called-side communication network;

an access-disable terminal information registering device in the calling-side communication network registers in an access-disable terminal storage device, based on the received access request cancel notice, identification information of the calling terminal which sent the access request and identification information of the called-side communication network which sent the access request cancel notice, which are associated with each other in the registration;

a terminal safety verifying device in the calling-side communication network verifies safety of the calling terminal; and an access rejection cancel request sending device in the calling-side communication network sends an access rejection cancel request to the called-side communication network when it is determined in the safety verification that the calling terminal satisfies the safety, where the access rejection cancel request contains the identification information of the calling terminal, and is sent by using the identification information of the called-side communication network which has been registered in the access-disable terminal storage device in association with the identification information of the calling terminal.

In a typical example, an access request cancel determination device in the called-side communication network determines whether or not the access request sent from the calling terminal is cancelled, based on the identification information of the calling terminal stored in an access-rejected terminal storage device or on a transmission history of past access requests from the calling terminal;

an access request cancel notice sending device in the called-side communication network sends an access request cancel notice when the access request is cancelled;

an access-rejected terminal registering device in the called-side communication network registers, based on the cancellation of the access request, the identification information of the calling terminal, which sent the access request, in the access-rejected terminal storage device; and an access open device in the called-side communication network receives the access rejection cancel request, retrieves the identification information of the calling terminal contained in the access rejection cancel request, and deletes the relevant identification information from the access-rejected terminal storage device.

Effect of the Invention

In accordance with the present invention, since a message which clearly indicates a disconnection by means of the operation of PUCI, and an addressee (telephone number or URL for the release request) to be accessed so as to release the registration as a bad caller are both communicated to the caller, it is possible to assist acquisition of information for recognizing a fact that the caller itself has been registered as a bad caller and for releasing such registration.

Also in accordance with the present invention, an interface between a calling-side HSS and a called-side IMS entity is newly defined so that the calling-side HSS can send the called side a request for releasing each subscriber who has been registered as a bad caller.

Accordingly, a subscriber who has corrected a target deficiency can inform the operator who has contracted the subscriber of the correction, and (a person in charge of) the operator can send a release request from the HSS through a maintenance and management system to each system in which the subscriber has been registered as a bad caller, thereby automatically issuing a release request for the subscriber who has been registered as a bad caller.

Also in accordance with the present invention, the present operator (communication carrier) can know information of a subscriber who belongs to the present operator and has been registered as a bad caller by another operator. Therefore, a further restriction may be imposed on a subscriber who has troubled another operator. Accordingly, it is possible to prevent a case in which not only is a spam call issued, but also the relevant network is affected by means of virus infection or the like.

MODE FOR CARRYING OUT THE INVENTION

Figure 1:
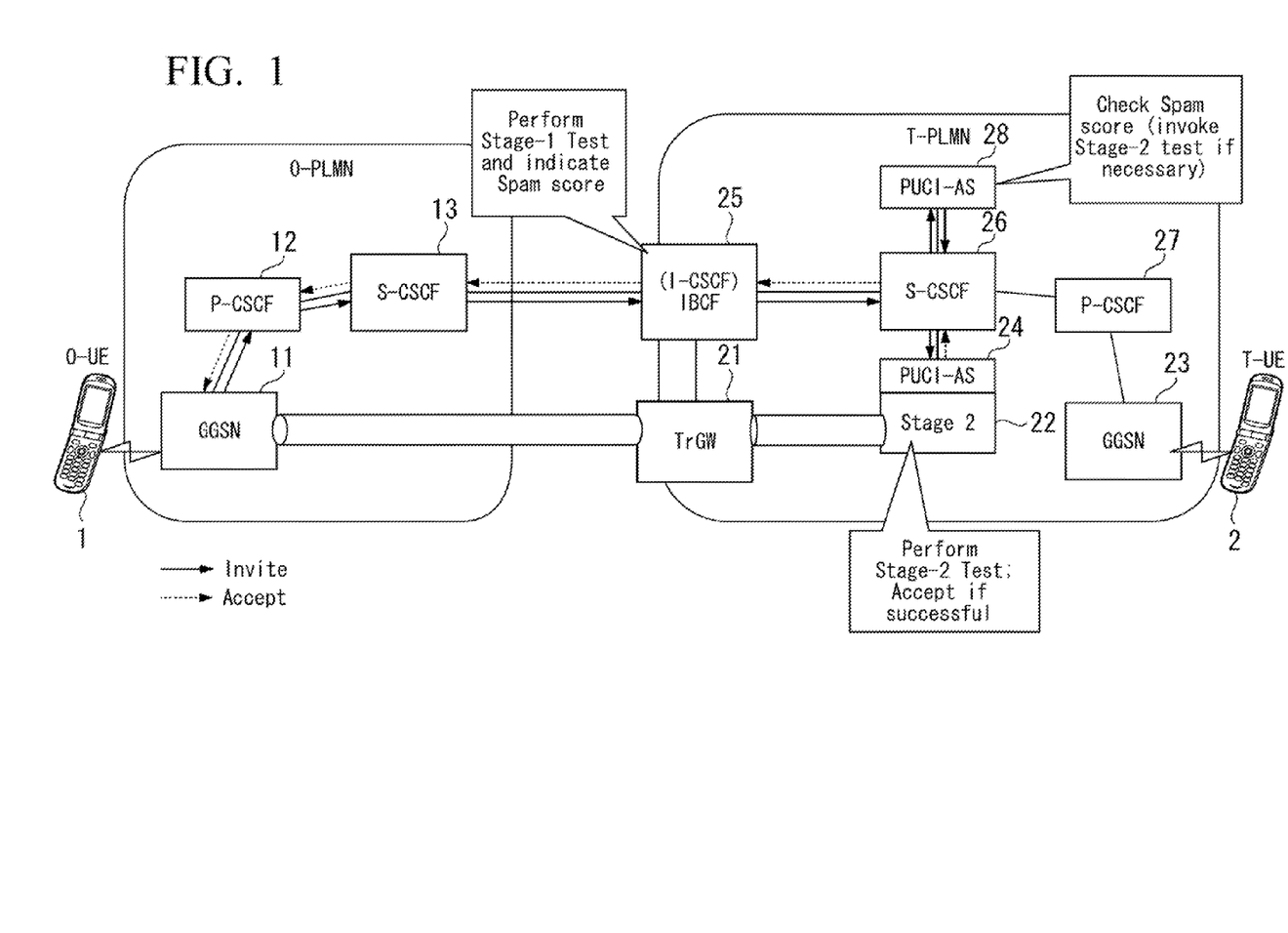
FIG. 1 is a block diagram showing the structure of an IMS network system.

FIG. 1 is a block diagram showing the structure of an IMS network system as an embodiment of the present invention.

The above FIG. 1 is a schematic diagram for an IMS network which employed PUCI. Before explaining the shown structure which solves target problems examined in PUCI, the operation concept of PUCI will be briefly explained below.

The leftmost O-UE indicates a calling terminal (i.e., originating UE), and the rightmost T-UE indicates a called terminal (i.e., terminating UE).

When the O-UE issues a call, a SIP INVITE message is issued for a SIP-URI (session initiation protocol-universal resource identifier) of the T-UE. This message is relayed in routing by an IMS of a calling-side mobile communication network called O-PLMN (public land mobile network), and received by a called-side mobile communication network called T-PLMN.

In IMS network systems, communication is performed using a SIP protocol. The above SIP-URI is an identifier on the SIP protocol, which is allocated to the O-UE or T-UE so as to identify the relevant O-UE or T-UE.

The O-UE tries to issue a call by sending the INVITE message to the SIP-URI of the T-UE. The INVITE message is first sent from the O-UE via a GGSN (gateway GPRS (general packet radio service) support node) 11 to a P-CSCF (proxy call session control function) part 12 (as a SIP server), and then relayed by the IMS of the O-PLMN on the calling side, so that it arrives at the T-PLMN on the called side.

An IBCF (I-CSCF) part 25, that is, an interconnect border control function (interrogating call session control function) part positioned at the entrance of the called side checks the reliability of a terminal which issued a call by any method (e.g., checks the probability that this call is the above-described SPIT), and writes information of a determined result or the like onto a header portion of the SIP INVITE message.

Such a passive operation of determining a calling party will be called a "Stage 1 test" below.

After that, the INVITE message is sequentially transferred between nodes inside the called-side IMS, and transmitted to an S-CSCF (service call session control function) part 26 which controls the T-UE.

The S-CSCF part 26 refers to the information stored in the INVITE message. If the S-CSCF part 26 determines that the relevant call is the SPIT and thus is worthless for reception, the S-CSCF part 26 can reject receiving the call without transferring the call to the relevant terminal. On the contrary, if the call is determined to be a good call to be received, the INVITE message is transferred to the relevant terminal, so that the call reception is completed.

In addition, a PUCI-AS (application server) 24 can be connected to the S-CSCF part 26, by which an optional determination logic can be added. That is, a test involving the calling side may be performed by, for example, observing a reaction to an intentional failure for call reception, or implementing an additional button operation. Such a test will be called a "Stage 2 test" below.

As described above, in the PUCI, no specific call control on the calling side (O-PLMN) is defined, and the called side (T-PLMN) performs various controls for defending against the SPIT by means of a CSCF part and a PUCI-AS which are entities for processing each call.

For the above-described IMS network system, the present embodiment has:

<1> Function of Feeding Information Back to the Caller for a Call whose Reception has been Restricted Through PUCI.

In the PUCI specification, the called side avoids a spam call by spontaneously registering the relevant caller as a bad caller, and rejecting future calls from the caller. In such a case, a caller who has repeatedly issued a call to the same addressee innocently so as to reserve a ticket or the like may be insidiously registered as a bad caller through the PUCI function.

In the current PUCI operation, when reception of a call is rejected by PUCI, the caller is communicated of the session interruption through a message (e.g., SIP error response message) which indicates rejection of the call reception. Therefore, such a case cannot be distinguished from a general failure of the call reception, which may be inconvenient for a good user on the calling side.

In also consideration of such a case, convenience can be further improved by providing a function of informing a caller that the caller has been registered as a bad caller, and a method of releasing such registration as a bad caller.

Therefore, it is possible for a user to know that the user has been registered as a bad caller and to obtain information for releasing such registration by incorporating (i) a message which indicates that PUCI performed the interruption, and (ii) an addressee (telephone number or URL) to be accessed so as to release the registration as a bad caller into a message (e.g., SIP error response message) which indicates rejection of the call reception.

For the above-described IMS network system, the present embodiment also has:

<2> Function of Collecting (by the Calling Side) Information Items for Bad Callers Acknowledged by the Called Side, and Making a Calling-Side Operator Collectively Issue Requests for Releasing the Relevant Registrations.

When a terminal is invaded by a virus or has a trouble, it may issue lots of IMS calls with no intention of the owner of the terminal, and be registered as a bad caller by a plurality of operators.

Even though the owner has killed the virus or performed updating to a software version having no problem, the owner needs to individually ask each of the plurality of the operators so as to release the bad-caller information, which is inconvenient for users.

When a called-side operator is asked to release the bad-caller registration based on information obtained by the above function <1>, the called-side operator has to absorb a cost for handling a problem of the calling-side operator who may be bad, and there is room for improvement in the distribution of cost. Additionally, even when the owner of the relevant terminal asks the operator who has contacted the owner about the problem, only the called-side operator can release the target registration, which is inconvenient for customer support in the relevant operation.

When the above function <1> is implemented, each calling-side IMS entity (e.g., CSCF part) is able to determine that a subscriber has been registered by the called side as a bad caller, obtain information indicating which subscriber is rejected, and which network rejects the subscriber, and store the obtained information in a subscriber database (e.g., HSS (home subscriber server)).

Therefore, an interface between a calling-side HSS and a called-side IMS entity is newly defined so that the calling-side HSS can send the called side a request for releasing each subscriber who has been registered as a bad caller.

Accordingly, the above-described problem can be solved when a subscriber who has corrected a target deficiency informs the operator who has contracted the subscriber of the correction, and (a person in charge of) the operator sends a release request from the HSS through a maintenance and management system to each system in which the subscriber has been registered as a bad caller.

For the above-described IMS network system, the present embodiment also has:

<3> Function of Imposing a Further Usage Restriction on a Bad Caller.

By using the above function <2>, the present operator can know information of a subscriber who belongs to the present operator and has been registered as a bad caller by another operator. Therefore, a further restriction may be imposed on a subscriber who has troubled another operator. Accordingly, it is possible to prevent a case in which not only is a spam call issued by means of virus infection or the like, but also the relevant network is affected.

That is, a chain of ill effects can be terminated by performing, for example:

(i) rejection of mobility management (forcible disconnection or detachment);
(ii) rejection of connection to a specific network;
(iii) rejection of an access to a non-IMS service (e.g., Web service) from a user to whom PUCI has applied a restriction, where the rejection is performed in cooperation with a server of the non-IMS service;
(iv) rejection of issuing an IMS call, or transfer the call to another addressee (e.g., of a window for solving problems); or
(v) rejection of "IMS Registration"

The above functions <1> to <3> will be further explained in detail.

The above function <1> of feeding information back to the caller for a call whose reception has been restricted through PUCI For the above function <1>, the I-CSCF, P-CSCF, and S-CSCF entities on the called side perform distinctive operations.

When rejecting a call which failed a PUCI test, the above CSCF parts on the called side send a calling-side IMS entity a message (e.g., SIP error response message) which indicates rejection of the call reception. In this process, information which indicates the rejection by PUCI and a telegraphic message which indicates an addressee to be accessed so as to release the relevant registration are added to the corresponding SIP header. The telegraphic message may be a character string understandable by humans, or a telegraphic message to be understood by the calling terminal.

Calling Terminal

When a message (e.g., SIP error response message) which indicates rejection of reception of a call issued from a calling terminal is returned to the calling terminal, the calling terminal tries to read information which is included in the corresponding header and relates to PUCI.

When information relating to PUCI (i.e., PUCI-related information) is included in the relevant response message, if the message is understandable by humans, the message may be displayed on a screen. If the message is a telegraphic message having a format understandable by the terminal, a button operation or the like may be performed on the terminal so as to access an addressee (of a Web site or a customer center) so as to directly release the relevant registration.

Calling-Side IMS Entity (P-CSCF and S-CSCF)

The calling-side IMS entities do not modify the PUCI-related information in the SIP message sent from the called side.

The above function <2> of collecting (by the calling side) information items for bad callers acknowledged by the called side, and making a calling-side operator collectively issue requests for releasing the relevant registrations For the above function <2>, the P-CSCF and S-CSCF entities on the calling side perform distinctive operations.

When the entities obtain a result of issuance of a call from a subscriber and the result indicates restriction of the call reception by means of PUCI, the relevant information is extracted and sent to the HSS.

HSS on Calling Side

It stores information obtained by CSCF, and sends a release request signal to an addressee (which has been stored) for the release request when detecting a data input operation (as a trigger) of a person in charge of maintenance.

CSCF Part, PUCI-AS, and Other PUCI-Related Devices on Called Side

They check the release request signal received from the calling-side HSS. If the signal is proper, the registration (in the present network) for the relevant subscriber as a bad subscriber is released.

The above function <3> of imposing a further usage restriction on a bad caller

For the above function <3>, the HSS entity on the calling side performs a distinctive operations.

It determines whether or not a further restriction is necessary, based on stored spam action information of the relevant subscriber. If a further restriction is necessary, implementation thereof is tried by sending a restriction request signal to a peripheral node by means of the following devices.

(1) Exchange (e.g., SGSN, GGSN, or EPC System)

It forcibly disconnects a specific subscriber when receiving a location registration cancel (or cancellation) request signal (e.g., cancel location signal) from a node (e.g., HSS or HLR (home location register)) which manages subscribers.

In another example, it rejects a PDN (packet data network) access request signal (i.e., a request signal for accessing an external network) from a specific subscriber when receiving a restriction request signal from HSS, so that a bad subscriber cannot access the relevant network.

(2) IMS Entity (CSCF)

When receiving a restriction request signal from HSS, it may reject call connection, transfer the relevant call to a problem handling window of the relevant operator, or reject registration to IMS (i.e., reject "REGISTER") so as to reject providing a service such as a voice call.

(3) Another Web Server Device or the Like

When receiving a restriction request signal from HSS, it may reject information service from the relevant Web server, or forcibly display a problem handling Web page of the corresponding operator.

Below the above function <2> (of collecting (by the calling side) information items for bad callers acknowledged by the called side, and making a calling-side operator collectively issue requests for releasing the relevant registrations) will be explained in detail.

Figure 2:
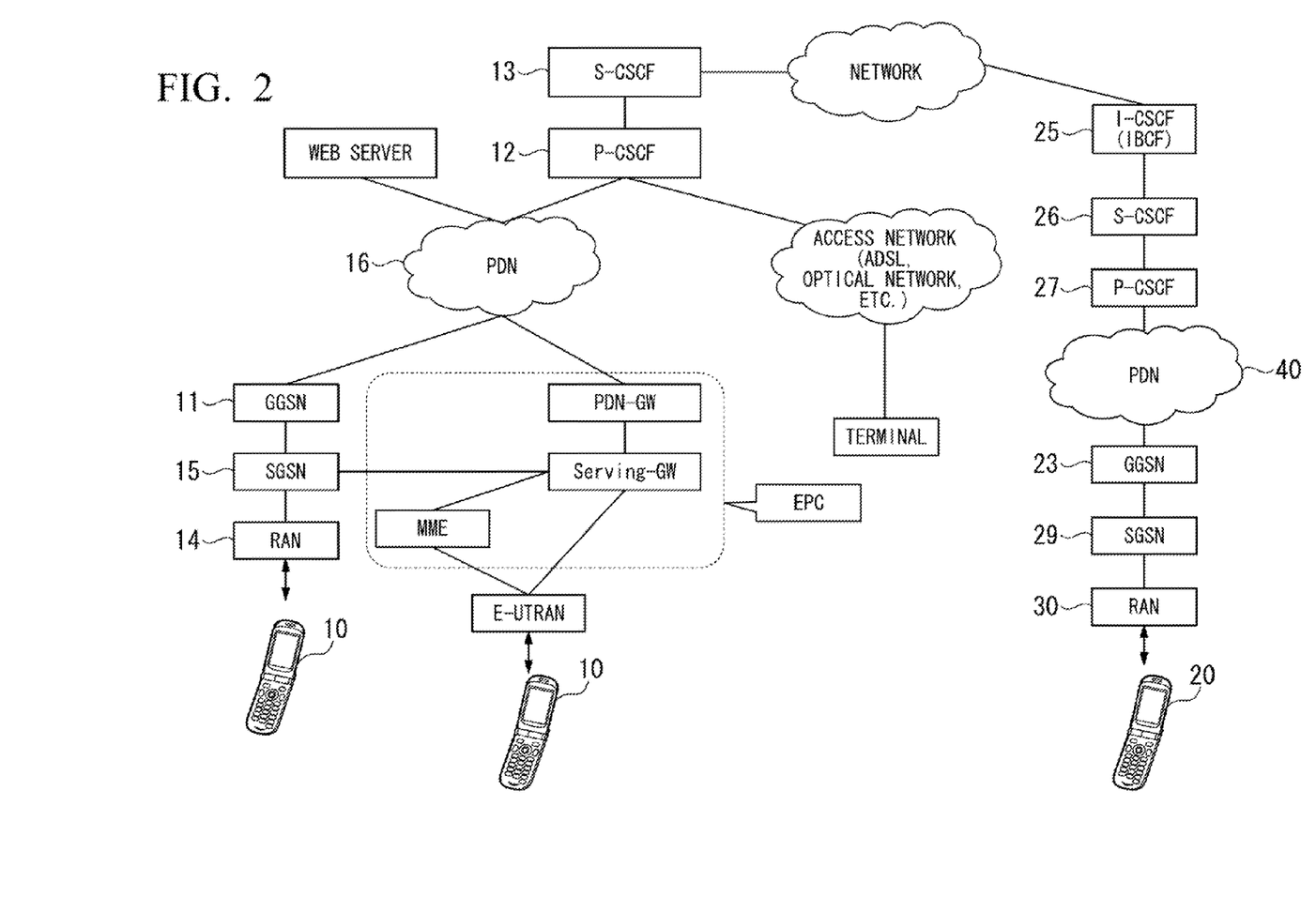
FIG. 2 is a second block diagram showing the structure of an IMS network system.

FIG. 2 is a second block diagram showing the structure of the IMS network system. This diagram shows the structure of the IMS network system in FIG. 1 in more detail.

As shown in FIG. 2, in the IMS network system, a calling terminal 10, an RAN (radio access network) 14, an SGSN (serving GPRS (general packet radio service) support node) 15, a GGSN (gateway GPRS support node) 11, a P-CSCF (proxy call session control function) part 12, and a S-CSCF (serving call session control function) part 13 are connected via a communication network, thereby forming a calling-side communication network.

In the calling-side communication network, the GGSN 11 and the P-CSCF part 12 are connected via a PDN (packet data network) 16.

Additionally, in the IMS network system, a called terminal 20 (corresponding to a T-UE), a RAN (radio access network) 30, an SGSN 29, a GGSN 23, a P-CSCF part 27, a S-CSCF part 26, and an I-CSCF (interrogating call session control function) part 25 are connected via a communication network, thereby forming a called-side communication network.

In the called-side communication network, the GGSN 23 and the P-CSCF part 27 are connected via a PDN (packet data network) 40.

Instead of using access networks corresponding to RANs 14 and 30 and access network nodes corresponding to SGSNs 15 and 29 and GGSNs 11 and 23 provided between the calling terminal 10 and P-CSCF part 12 and between the called terminal 20 and P-CSCF part 27, a communication network using a group of servers and a group of gateways such as an E-UTRAN (evolved universal terrestrial radio access network), an MME (mobility management entity), a Serving-GW (gateway), and a PDN-GW (gateway) may be employed so as to form an IMS network system.

Figure 3:
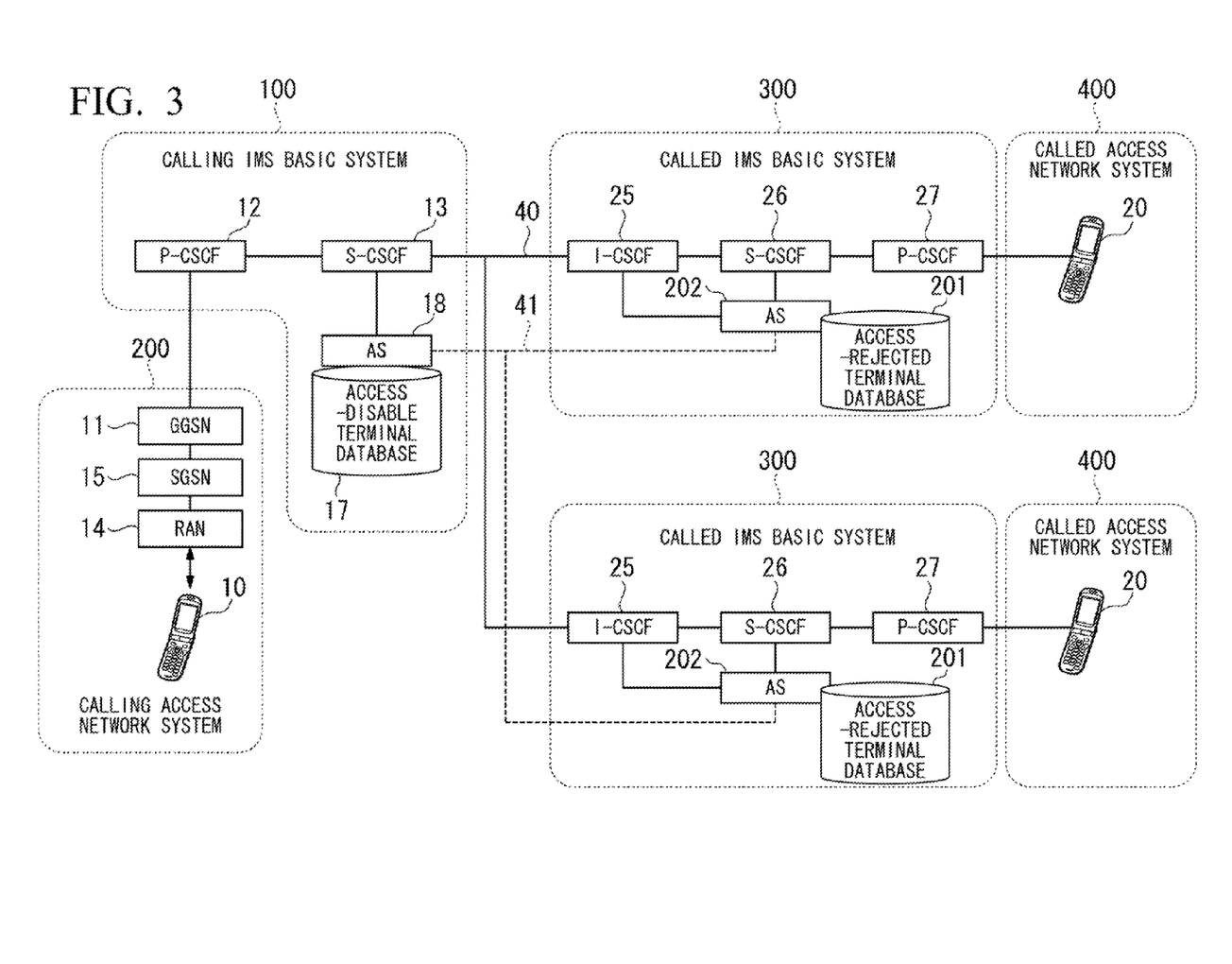
FIG. 3 is a third block diagram showing the structure of an IMS network system.

FIG. 3 is a third block diagram showing the structure of the IMS network system.

Referring to FIG. 3, an example of the structure of the IMS network system will be explained. FIG. 3 shows a structure obtained by further simplifying the IMS network system in FIG. 2 for convenience of explanations.

As shown in FIG. 3, the IMS network system is divided into a calling-side communication network and a called-side communication network. The calling-side communication network consists of a calling IMS basic system 100 and a calling access network system 200, and the called-side communication network consists of a called IMS basic system 300 and a called access network system 400.

In order to show that the calling-side communication network can be connected to a plurality of the called-side communication networks, FIG. 3 shows two called IMS basic systems 300 and two called access network systems 400.

The calling access network system 200 includes RAN 14, SGSN 15, and GGSN 11, and the calling IMS basic system 100 includes P-CSCF part 12, S-CSCF part 13, and an application server 18 and an access-disable terminal database (DB) 17 which are connected to S-CSCF part 13.

Similarly, the called IMS basic system 300 includes I-CSCF part 25, S-CSCF part 26, P-CSCF part 27, and an application server 202 and an access-rejected terminal database (DB) 201 which are connected to I-CSCF part 25 and S-CSCF part 26.

In simplified FIG. 3, only the called terminal 20 is shown in each called access network systems 400. However actually, as shown in FIG. 2, the called terminal 20 is connected to S-CSCF part 26 via RAN 30, SGSN 29, GGSN 23, and a PDN, similar to the calling access network system 200.

In the present embodiment, the called-side communication network is operated using a communication carrier which differs from that of the calling-side communication network, and thus, S-CSCF part 13 in the calling-side communication network is connected to I-CSCF part 25 in the called-side communication network. However, if the called-side communication network and the calling-side communication network are operated using the same communication carrier, S-CSCF parts of both communication networks are connected directly to each other.

Figure 4:
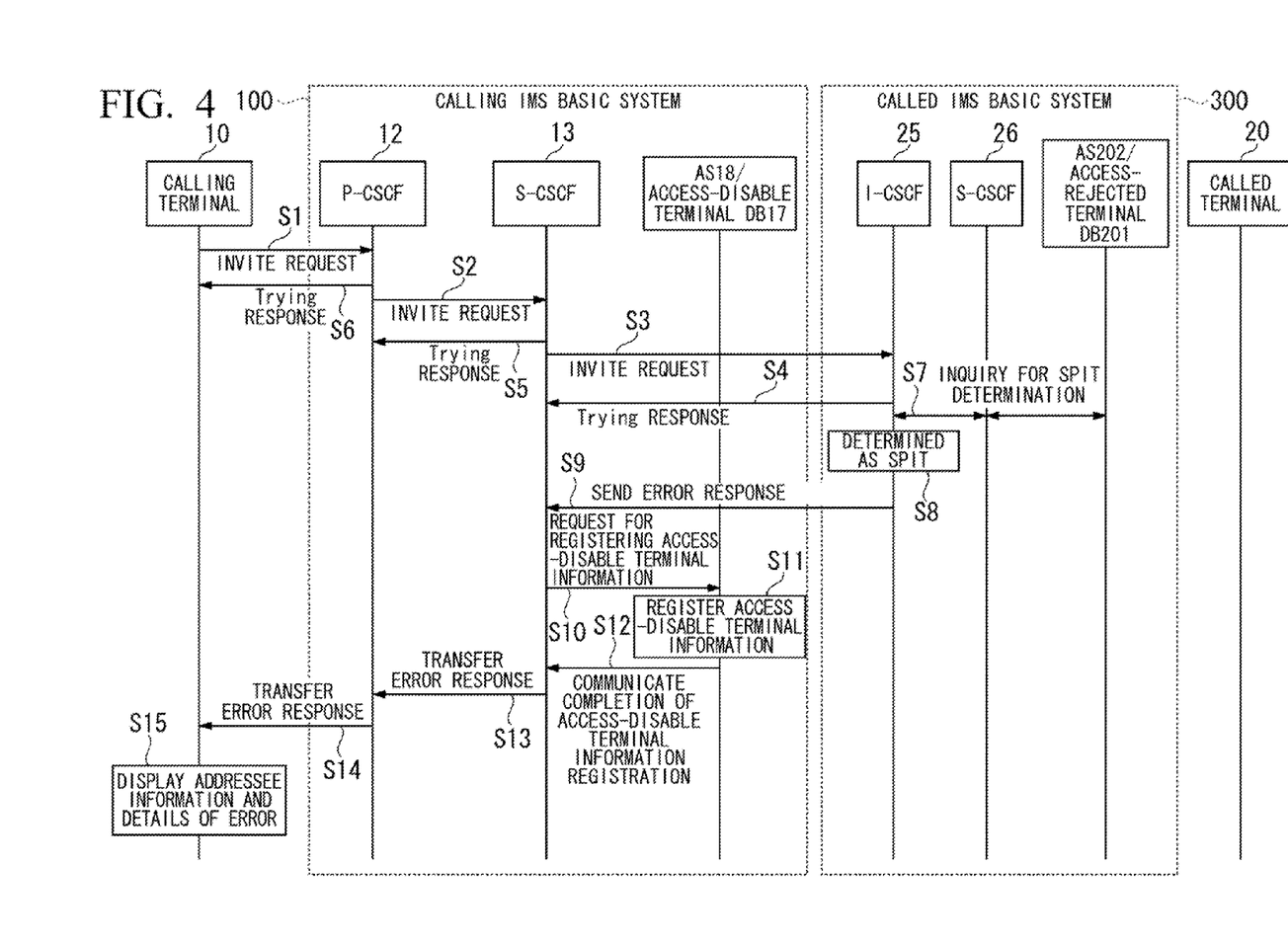
FIG. 4 is a first diagram showing an operation flow of some devices in the IMS network system.

FIG. 4 is a first diagram showing an operation flow of some devices in the IMS network system.

Referring to FIG. 4, a first operation flow of the devices in the IMS network system will be explained.

First, when the calling terminal 10 sends an INVITE request (see step S1), the request is received by P-CSCF part 12 (as an access request transfer device) via the calling access network system 200.

The P-CSCF part 12 transfers the INVITE request to S-CSCF part 13 (as an access request transfer device) (see step S2), which detects the SIP-URI of the calling terminal 10. The S-CSCF part 13 also detects the SIP-URI of I-CSCF part 25 (in the called-side communication network) as an addressee which has been stored in the application server 18 or the like in association with the SIP-URI of the calling terminal 10. The S-CSCF part 13 sends the INVITE request to the IP-URI of I-CSCF part 25 (see step S3).

When I-CSCF part 25, S-CSCF part 13, and P-CSCF part 12 each receive the INVITE request, they each return a Trying response to the device which sent the relevant INVITE request (see steps S4, S5, and S6).

When I-CSCF part 25 returns the Trying response via step S4, it issues an inquiry for SPIT (spam over IP telephony) determination (see step S7).

In the SPIT determination, I-CSCF part 25 may retrieve the combination of SIP-URIs of the calling terminal 10 and the called terminal 20 stored in the INVITE request, and send the application server 202 information about the inquiry for the SPIT determination, where the information contains the above combination of SIP-URIs.

The application server 202 (as an access request cancel determination device) returns a result response to I-CSCF part 25 based on information stored in the access-rejected terminal database 201 (as an access-rejected terminal storage device), a memory, or the like.

More specifically, SPIT may be determined when the access-rejected terminal database (DB) stores information (in association with the SIP-URI combination) which indicates whether the relevant access is approved or disapproved, and the information indicates that the access is disapproved (such disapproval information is stored by any method). In another example, SPIT may be determined by the application server 202 when mechanically repeated sending (e.g., for every 5 minutes) of INVITE request for the detected SIP-URI combination is observed in a table of past INVITE requests.

If I-CSCF part 25 (as an access request cancel notice sending device) determines, based on the inquiry for the SPIT (spam over IP telephony) determination, that the relevant INVITE request is a signal which indicates SPIT (see step S8), I-CSCF part 25 directs the application server 202 (as an access-rejected terminal registering device) to register information for identifying the calling terminal 10 (e.g., SIP-URI of the calling terminal 10) which sent the INVITE request in the access-rejected terminal database 201, as information which indicates that the relevant calling terminal is an improper calling terminal which performed SPIT operation and a target for cancelling future INVITE requests (as access requests).

In addition, I-CSCF part 25 (as the access request cancel notice sending device) sends an error response (as an access request cancel notice) to S-CSCF part 13 (as an access request cancel notice receiving device) (see step S9).

The error response stores information of an addressee to be accessed so as to release the access request cancel registration. The addressee may be a mail address or a telephone number of a Web server or a contact center.

Additionally, identification information for the calling terminal or the called-side communication network, or information about a start time or duration for the restriction may also be included (in the error response) as error information.

If I-CSCF part 25 determines in the SPIT determination that the INVITE request is not a signal which indicates SPIT, I-CSCF part 25 performs a conventional normal operation that sends the INVITE request to the called terminal 20 via P-CSCF part 27 in the called-side communication network.

When S-CSCF part 13 receives the error response sent from I-CSCF part 25, it performs a process for checking propriety of the error response.

In the above propriety checking, S-CSCF part 13 may send the application server 18 connected to itself, information for requesting propriety checking about I-CSCF part 25 indicated (in the error response) as the sender of the error response, and the application server 18 may determine, based on the information for requesting propriety checking, (i) whether information for node identification (such as an IP address or host name of I-CSCF part 25) or SIP-URI for an error session has been stored, or (ii) whether the structure or content of the corresponding SIP header has consistency.

The above propriety checking may be executed by S-CSCF part 13.

When the propriety of the error response can be confirmed, S-CSCF part 13 detects at least identification information (e.g., SIP-URI) of the calling terminal 10 and identification information (e.g., IP address of the application server 202 in the called-side communication network) of the called-side communication network which has cancelled the access request, which are contained in the error response. The S-CSCF part 13 then sends the application server 18 a request for registering access-disable terminal information which includes a pair of the identification information of the calling terminal 10 and the identification information of the called-side communication network (see step S10). The application server 18 (as an access-disable terminal information registering device) registers the access-disable terminal information in the access-disable terminal database 17 (as an access-disable terminal storage device) or the like (see step S11).

Accordingly, the calling-side communication carrier which manages the calling-side communication network can store information about a called-side communication carrier (which manages a corresponding called-side communication network) which has canceled the relevant access request issued from a calling terminal belonging to the calling-side communication carrier.

After the application server 18 registers the access-disable terminal information, the application server 18 informs S-CSCF part 13 of completion of the registration (see step S12).

The S-CSCF part 13 then transfers the error response to P-CSCF part 12 (see step S13), and P-CSCF part 12 transfers the error response to the calling terminal 10 (see step S14).

When receiving the error response, the calling terminal 10 displays the information (about an addressee to be accessed (i.e., addressee information), details of the error, etc.) stored in the error response, on a display part or the like (see step S15).

The calling terminal 10 also sends an access request signal to the addressee indicated by the addressee information in response to a users operation, or automatically.

When S-CSCF part 13 sends the error response in step S13, the addressee information included in the error response sent from I-CSCF part 25 may be replaced with different addressee information, and the different addressee information may be sent. For example, the information of an addressee to be accessed on the called side may be replaced with an addressee to be dedicatedly accessed on the calling side. Accordingly, the calling terminal 10 can be connected to such a dedicate addressee on the calling side.

Figure 5:
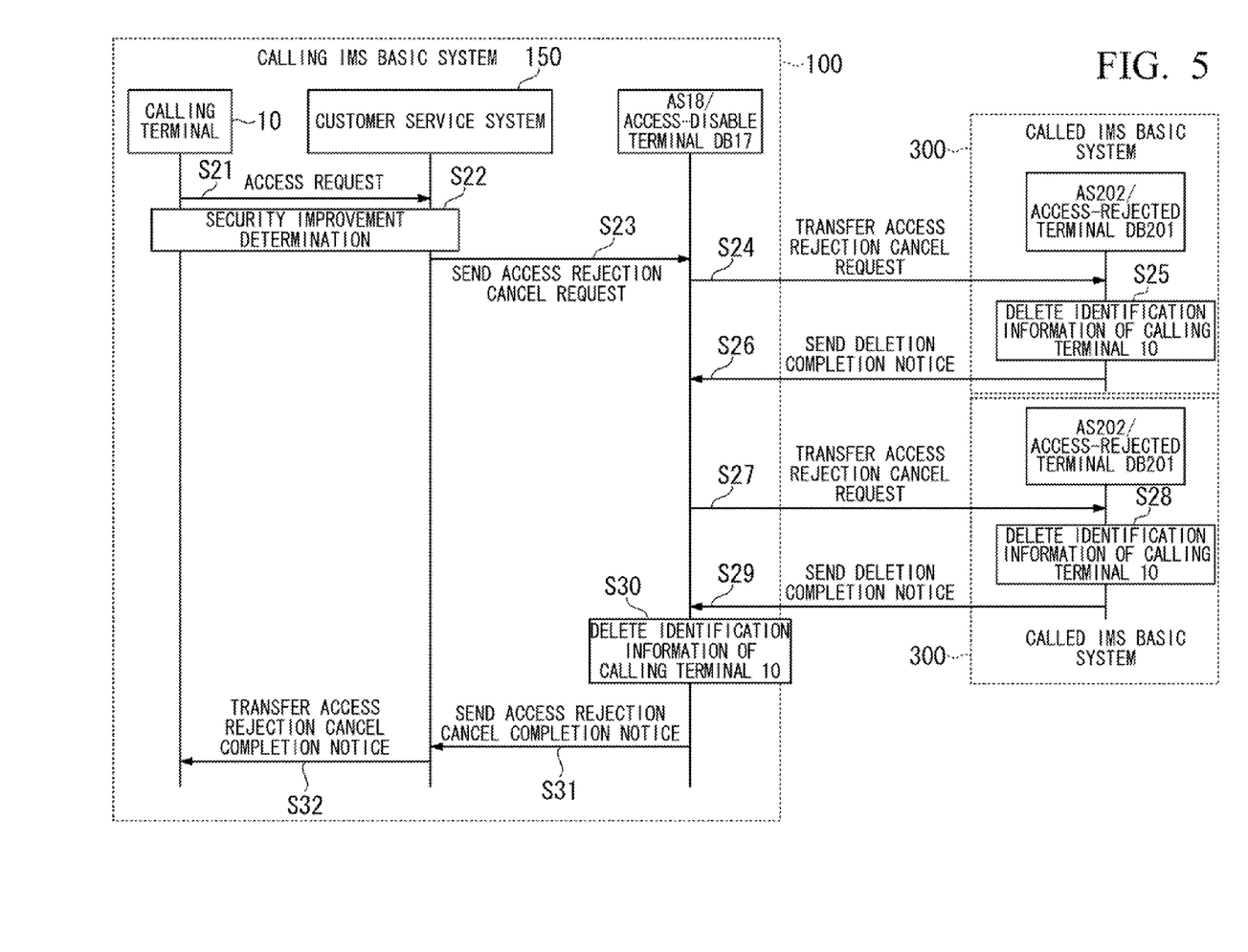
FIG. 5 is a second diagram showing an operation flow of some devices in the IMS network system.

FIG. 5 is a second diagram showing an operation flow of some devices in the IMS network system.

Referring to FIG. 5, a second operation flow of the devices in the IMS network system will be explained.

For the calling terminal 10, information about an addressee to be accessed and error information were displayed in step S15. Thus, the calling terminal 10 was determined to be a bad terminal due to some problem, and an access request from the calling terminal 10 was cancelled by the called-side communication network.

For example, if a virus software source has intruded into the calling terminal 10, quantities of access requests are issued by processing the virus software, so that the calling terminal 10 may be registered as a bad calling terminal, which performed a SPIT operation and whose future INVITE request as an access request will be cancelled, in the access-rejected terminal database 201 of the called-side communication network.

In such a case, the user who operates the relevant calling terminal 10 must perform an operation for improving the security of the calling terminal 10 and also an operation for requesting withdrawal of the access request cancellation to the communication carrier which manages each communication network (i.e., called-side communication network) which has registered the calling terminal 10 as a bad terminal.

There are a great number of communication carriers over the world. Therefore, if many of them have registered the calling terminal 10 as a bad terminal, the user who operates the calling terminal 10 must perform such an operation for requesting withdrawal of the access request cancellation to each of the communication carriers, which may impose great burden on the user.

In addition, if the user cannot grasp all communication networks which performed such registration, it is difficult to request the withdrawal of the access request cancellation.

In consideration of the above, in the following operation, the communication network managed by a communication carrier who manages the calling terminal collectively performs the request of withdrawal of the access request cancellation for the communication being registered as a bad terminal.

When information about an addressee to be accessed (i.e., addressee information) and error information (e.g., details of the error) are displayed on the calling terminal 10 in the above step S15, the user who operates the calling terminal 10 knows that the access request to the called terminal 20 has been cancelled in the called-side communication network, and operates the calling terminal 10 so that the calling terminal 10 accesses the addressee indicated by the addressee information.

Accordingly, the calling terminal 10 sends an access request to a customer service system 150 (see step S21). For the accessing operation, the calling terminal 10 may automatically access the addressee indicated by the addressee information.

The addressee to be accessed may by a customer service system managed by the communication carrier to which the calling terminal 10 belongs. When the customer service system 150 accepts the access from the calling terminal 10, the customer service system 150 communicates with the calling terminal 10 and sends the calling terminal 10 a request for retrieving, for example, version information about the calling terminal 10, a program number assigned to a security improvement program applied to the corresponding OS, etc., so as to obtain version information about the OS and the program number of the security improvement program.

The customer service system 150 then determines whether or not the obtained OS version information and number of the security improvement program are latest issues. If they the not latest issues, the customer service system 150 sends a latest OS improvement program or a latest security improvement program to the calling terminal 10, and directs the calling terminal 10 to execute the relevant program so as to improve the security of the calling terminal 10.

Additionally, the customer service system 150 may send a virus killing program and an instruction to execute the program to the calling terminal 10, so as to improve the security of the calling terminal 10.

After the above operation, when the customer service system 150 (as a terminal safety verifying device and an access rejection cancel request sending device) confirms an improvement in the safety of the calling terminal 10 (see step S22), the customer service system 150 sends the application server 18 an access rejection cancel (or cancellation) request which contains the identification information (e.g., SIP-URI) of the calling terminal 10 (see step S23).

When receiving the access rejection cancel request, the application server 18 detects the identification information (e.g., SIP-URI) of the calling terminal 10 contained in the access rejection cancel request, and retrieves the identification information (e.g., IP address of the application server 202) of the called-side communication network, which has been stored in the access-disable terminal database 17 and in associated with the identification information of the calling terminal 10.

The application server 18 then uses a virtual communication network (see reference numeral 41 in FIG. 3) other than the communication network (see reference numeral 40 in FIG. 3) which is used for providing a service to each user in the called-side communication network, so as to transfer the access rejection cancel request to the retrieved IP address of the application server 202 in the relevant called-side communication network (see step S24)

That is, in the present network system, in addition to an ordinary communication route, another route is provided in which the application server 18 can directly communicate with the application server 202. Physically, such an ordinary communication route and a directly communicable route alignment may be provided by individual lines, or a common line.

The above access rejection cancel request indicates that the communication carrier, which manages the calling-side communication network to which the relevant calling terminal 10 belongs, informs the called-side communication network that the safety of the calling terminal 10 has been proved.

If the access-disable terminal database 17 stores a plurality of identification information items for the called-side communication network associated with the identification information of the calling terminal 10, it indicates that the calling terminal 10 has been registered as a bad terminal in a corresponding number of communication networks. Therefore, the application server 18 in the calling-side communication network transfers the access rejection cancel request to each of the relevant communication networks (see step S27).

Accordingly, the calling-side communication network can collectively request all the called-side communication network, which have registered the calling terminal 10 as a bad terminal, to cancel the access rejection for the calling terminal 10, thereby reducing a burden imposed on the user who must perform an operation for cancelling the access rejection.

In each called-side communication network, the application server 202 receives the access rejection cancel request.

The application server 200 then determines whether or not the access rejection cancel request is proper by, for example, determining whether or not the IP address or MAC (media access control) address of the addresser, which is contained in the access rejection cancel request, coincides with the corresponding data registered in a database or the like.

When it is determined that the above access rejection cancel request is proper, the application server 202 (as an access open device) detects the identification information (e.g., SIP-URI) of the calling terminal 10 contained in the access rejection cancel request, and deletes the identification information of the calling terminal 10 from the access-rejected terminal database 201 (see steps S25 and S28).

Accordingly, when a next access request is issued from the relevant calling terminal 10, no identification information of the calling terminal 10 is not registered in the access-rejected terminal database 201. Therefore, the corresponding application server 202 does not perform cancellation of the access request based on the database 201.

The application server 202 sends the application server 18 of the calling-side communication network a deletion completion notice which contains the identification information of the calling terminal 10 (see steps S26 and S29).

When receiving the deletion completion notice, the application server 18 deletes the identification information of the calling terminal 10, which is contained in the deletion completion notice, from the access-disable terminal database 17 (see step S30).

Accordingly, it is possible to delete the information such that the calling terminal 10 managed in the calling-side communication network has been registered as a bad terminal.

The application server 18 then sends an access rejection cancel completion notice to the customer service system 150 (see step S31), and the customer service system 150 transfers the access rejection cancel completion notice to the calling terminal 10 (see step S32).

The above-described operation implements collective access-rejection cancellation by the cooperative devices in the calling-side communication network.

In the above operation, when the application server 200 of the called-side communication network receives the access rejection cancel request and deletes the identification information of the calling terminal 10 from the access-rejected terminal database 201, the application server 200 then accepts each communication from the calling terminal 10. However, instead, only a limited type of communication may be subjected to the access rejection cancellation for a specific period of time.

That is, there are many communication devices from the calling-side communication network to the called-side communication network, which include not only a telephone but also email communication, short message communication, chat communication, and the like. Therefore, among them, only one of the communication devices may be may be subjected to the access rejection cancellation for a specific period of time, and if no problem has occurred, the remaining communication devices may also be subjected to the access rejection cancellation collectively or gradually.

In such a case, the application server 202 of the called-side communication network stores, in the access-rejected terminal database 201, the identification information of the calling terminal 10, information of individual communication types, and information which indicates that all of the communication types are ineffective. When receiving the access rejection cancel request, the application server 202 first deletes data of the association between the identification information of the calling terminal 10 and any one of the communication types, and after that, deletes data of the associations between the identification information of the calling terminal 10 and the remaining communication types collectively or gradually (one by one).

In accordance with the above operation, a cancel request for a subscriber whose terminal has a low degree of security and has been registered as a bad caller can be sent from the calling-side communication network to a plurality of called-side devices collectively, thereby reducing a burden imposed on the user of the relevant terminal.

Although the present embodiment employs an INVITE method typically used for voice communication in IMS, the present invention can be applied to any method used in IMS, for example, a REGISTER method of registering the existence of UE to a CSCF part (as SIP server) or a MESSAGE method for sending and receiving text messages.

The device as each entity in the IMS network system includes a computer system.

Each of the above-described processes is stored as a program format in a computer-readable storage medium, and executed when the relevant computer loads and executes the program.

The computer-readable storage medium may be a magnetic disk, a magneto-optical disk, a CD-ROM, a DVD-ROM, or a semiconductor memory. Such a computer program may be provided to a computer via a communication line, and the computer which receives the program may execute the program.

In addition, a program for performing a portion of the above-explained processes may be used. Furthermore, a differential file (i.e., a differential program) to be combined with a program which has already been stored in the computer system may be provided to realize the above processes.

INDUSTRIAL APPLICABILITY

In accordance with the present invention, since a message which clearly indicates a disconnection by means of the operation of PUCI, and an addressee (telephone number or URL for the release request) to be accessed so as to release the registration as a bad caller are both communicated to the caller, it is possible to assist acquisition of information for recognizing a fact that the caller itself has been registered as a bad caller and for releasing such registration.

Also in accordance with the present invention, an interface between a calling-side HSS and a called-side IMS entity is newly defined so that the calling-side HSS can send the called side a request for releasing each subscriber who has been registered as a bad caller.

Accordingly, a subscriber who has corrected a target deficiency can inform the operator who has contracted the subscriber of the correction, and (a person in charge of) the operator can send a release request from the HSS through a maintenance and management system to each system in which the subscriber has been registered as a bad caller, thereby automatically issuing a release request for the subscriber who has been registered as a bad caller.

REFERENCE SYMBOLS

1 O-UE (originating UE)
2 T-UE (terminating UE)
10 calling terminal

11 GGSN (gateway GPRS (general packet radio service) support node)
12 P-CSCF (proxy call session control function) part
13 S-CSCF (serving call session control function) part
14 RAN (radio access network)
15 SGSN (serving GPRS (general packet radio service) support node)
16, 40 PDN (packet data network)
17 access-disable terminal database
18, 202 application server
20 called terminal
21 TrGW (translation gateway)
22 Stage 2 server
23 GGSN (gateway GPRS support node)
24 PUCI-AS (protection against unsolicited communication for IMS-application server)
25 IBCF (interconnect border control function) part, I-CSCF (interrogating call session control function) part
26 S-CSCF (serving call session control function) part
27 P-CSCF (proxy call session control function) part
28 PUCI-AS (protection against unsolicited communication for IMS-application server)
29 SGSN (serving GPRS support node)
30 RAN (radio access network)
201 access-rejected terminal database

The invention claimed is:

1. A communication system providing a multimedia service which enables requesting a communication network to cancel a registration for a calling terminal as a bad terminal in the communication network, wherein:
   the calling terminal is connected to a calling-side communication network;
   if the calling terminal is registered as a bad terminal in a called-side communication network, the calling-side communication network requests the called-side communication network to cancel the registration; and
   the calling-side communication network includes:
      an access request transfer device that transfers an access request, which has been sent from the calling terminal, to the called-side communication network;
      an access request cancel notice receiving device that receives an access request cancel notice, which indicates cancellation of the access request, from the called-side communication network;
      an access-disable terminal information registering device that registers in an access-disable terminal storage device, based on the received access request cancel notice, identification information of the calling terminal which sent the access request and identification information of the called-side communication network which sent the access request cancel notice, which are associated with each other in the registration;
      a terminal safety verifying device that verifies safety of the calling terminal; and
      an access rejection cancel request sending device that sends an access rejection cancel request to the called-side communication network when it is determined in the safety verification that the calling terminal satisfies the safety, where the access rejection cancel request contains the identification information of the calling terminal, and is sent by using the identification information of the called-side communication network which has been registered in the access-disable terminal storage device in association with the identification information of the calling terminal.

2. The communication system in accordance with claim 1, wherein the communication system is an IMS, that is, an Internet multimedia subsystem.

3. The communication system in accordance with claim 1, wherein communication in the communication system includes SPIT, that is, spam over IP telephony.

4. The communication system in accordance with claim 1, wherein the called-side communication network includes:
   an access request cancel determination device that determines whether or not the access request sent from the calling terminal is cancelled, based on the identification information of the calling terminal stored in an access-rejected terminal storage device or on a transmission history of past access requests from the calling terminal;
   an access request cancel notice sending device that sends an access request cancel notice when the access request is cancelled;
   an access-rejected terminal registering device that registers, based on the cancellation of the access request, the identification information of the calling terminal, which sent the access request, in the access-rejected terminal storage device; and
   an access open device that receives the access rejection cancel request, retrieves the identification information of the calling terminal contained in the access rejection cancel request, and deletes the retrieved identification information from the access-rejected terminal storage device.

5. The communication system in accordance with claim 4, wherein:
   in the registration of the identification information of the calling terminal which sent the access request, the access-rejected terminal registering device associates this identification information with each target communication type for the access request cancellation, selected from among a plurality of communication types; and
   the access open device deletes part or all of the associations between the identification information of the calling terminal contained in the access rejection cancel request and each communication type.

6. A communication control method used in a communication system which controls communication between a calling terminal connected to a calling-side communication network and a called terminal connected to a called-side communication network, wherein:
   an access request transfer device in the calling-side communication network transfers an access request, which has been sent from the calling terminal, to the called-side communication network;
   an access request cancel notice receiving device in the calling-side communication network receives an access request cancel notice, which indicates cancellation of the access request, from the called-side communication network;
   an access-disable terminal information registering device in the calling-side communication network registers in an access-disable terminal storage device, based on the received access request cancel notice, identification information of the calling terminal which sent the access request and identification information of the called-side communication network which sent the access request cancel notice, which are associated with each other in the registration;
   a terminal safety verifying device in the calling-side communication network verifies safety of the calling terminal; and an access rejection cancel request sending device in the calling-side communication network sends an access rejection cancel request to the called-side communication network when it is determined in the safety verification that the calling terminal satisfies the safety, where the access rejection cancel request contains the identification information of the calling terminal, and is sent by using the identification information of the called-side communication network which has been registered in the access-disable terminal storage device in association with the identification information of the calling terminal.

7. The communication control method in accordance with claim 6, wherein:
- an access request cancel determination device in the called-side communication network determines whether or not the access request sent from the calling terminal is cancelled, based on the identification information of the calling terminal stored in an access-rejected terminal storage device or on a transmission history of past access requests from the calling terminal;
- an access request cancel notice sending device in the called-side communication network sends an access request cancel notice when the access request is cancelled;
- an access-rejected terminal registering device in the called-side communication network registers, based on the cancellation of the access request, the identification information of the calling terminal, which sent the access request, in the access-rejected terminal storage device; and
- an access open device in the called-side communication network receives the access rejection cancel request, retrieves the identification information of the calling terminal contained in the access rejection cancel request, and deletes the retrieved identification information from the access-rejected terminal storage device.

8. The communication control method in accordance with claim 7, wherein:
- in the registration of the identification information of the calling terminal which sent the access request, the access-rejected terminal registering device in the called-side communication network associates this identification information with each target communication type for the access request cancellation, selected from among a plurality of communication types; and
- the access open device in the called-side communication network deletes part or all of the associations between the identification information of the calling terminal contained in the access rejection cancel request and each communication type.

* * * * *